(12) United States Patent
Persson et al.

(10) Patent No.: US 8,509,242 B2
(45) Date of Patent: Aug. 13, 2013

(54) METHOD AND DEVICE FOR CONTROLLING DATA FLOWS AT COMMUNICATION TERMINALS

(75) Inventors: Fredrik F Persson, Märsta (SE); Göran Eriksson, Norrtälje (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 802 days.

(21) Appl. No.: 12/279,744

(22) PCT Filed: Feb. 17, 2006

(86) PCT No.: PCT/SE2006/000221
§ 371 (c)(1),
(2), (4) Date: Aug. 18, 2008

(87) PCT Pub. No.: WO2007/094709
PCT Pub. Date: Aug. 23, 2007

(65) Prior Publication Data
US 2010/0220648 A1 Sep. 2, 2010

(51) Int. Cl.
*H04L 12/56* (2011.01)

(52) U.S. Cl.
USPC ...... 370/395.42; 370/235; 370/328; 370/412; 370/468; 709/232; 455/453

(58) Field of Classification Search
USPC ........... 370/235, 236, 310.2, 328, 338, 395.4, 370/395.41, 395.42, 395.43, 412, 413, 417, 370/468; 709/232–235; 455/453
See application file for complete search history.

(56) References Cited

U.S. PATENT DOCUMENTS

| | | | |
|---|---|---|---|
| 6,988,133 B1 | 1/2006 | Zavalkovsky | |
| 2002/0116655 A1* | 8/2002 | Lew et al. | 713/323 |
| 2006/0291416 A1* | 12/2006 | Rexhepi et al. | 370/331 |
| 2007/0032200 A1* | 2/2007 | Taneja | 455/70 |
| 2008/0098446 A1* | 4/2008 | Seckin et al. | 725/114 |

FOREIGN PATENT DOCUMENTS
WO  WO 00/10357  * 2/2000

OTHER PUBLICATIONS

Sanchez, et al., "Mixing conversational and interactive traffic in the UMTS radio access network", 4th IEEE Conference on Mobile and Wireless Communication Network (WMCN2002), Stockholm, Sweden, Sep. 9-11, 2002.

* cited by examiner

*Primary Examiner* — Hoon J Chung
(74) *Attorney, Agent, or Firm* — Roger S. Burleigh

(57) ABSTRACT

The present invention involves traffic management in a communication system (1) comprising multiple communication terminal (10, 200) that each has data flows presented in transmit buffers (14, 220). The terminals (10, 200) utilize a default priority scheme for selecting data from the buffers (14, 220) to transmit at transmission occasions determined by a schedule scheme. A switching event is detected based on information of an estimate distribution of data flows in a first portion (2) of the system (1). A priority scheme update message is generated based on this event detection. The update message comprises information of a temporary priority scheme that is to be used by terminals (10, 200) in a second portion (2; 5) of the system (1). By using this temporary scheme that assigns new temporary priorities to the data flows, a local shaping of the transmission pattern and data flow distribution in the second system portion (2; 5) is possible.

33 Claims, 9 Drawing Sheets

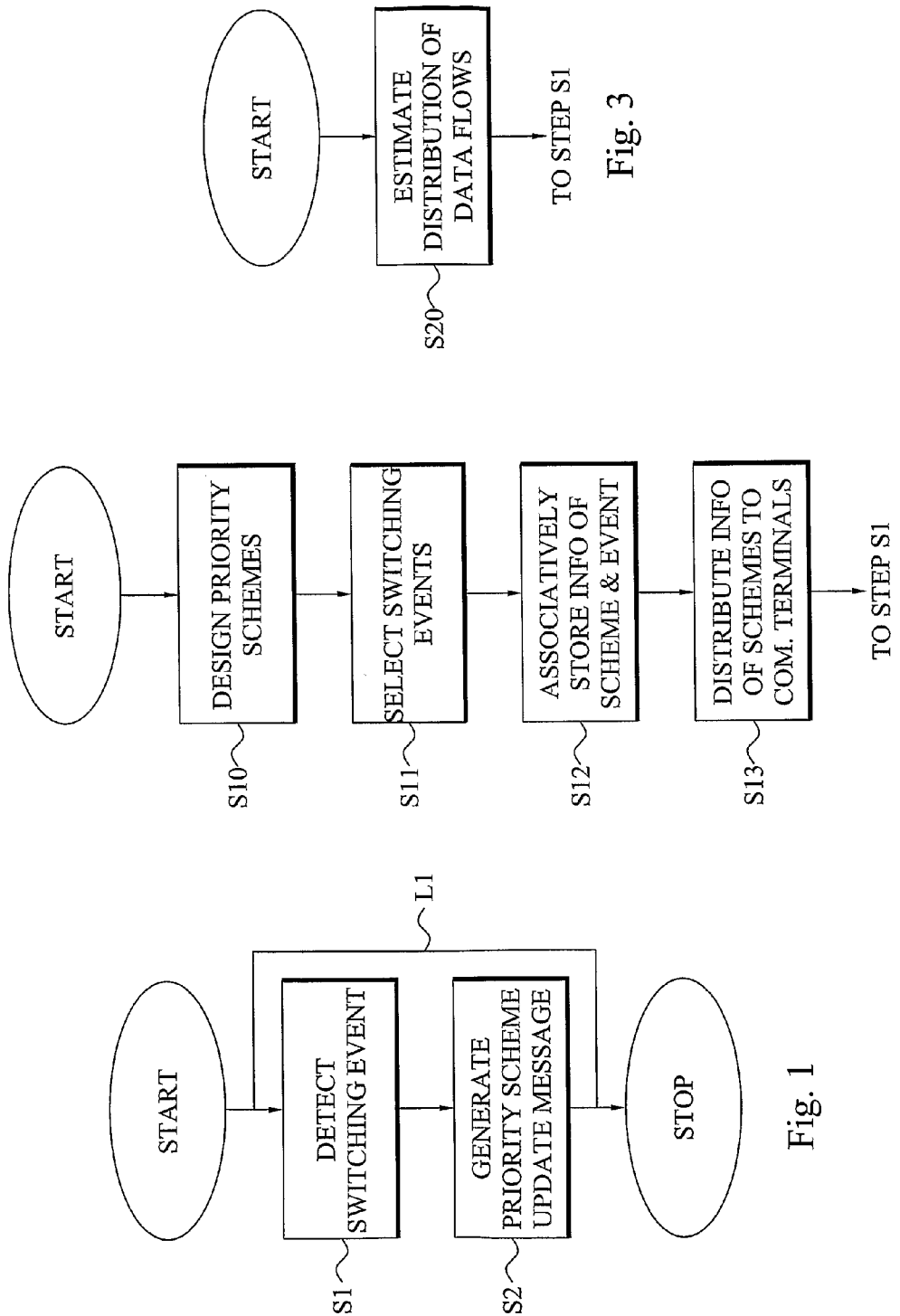

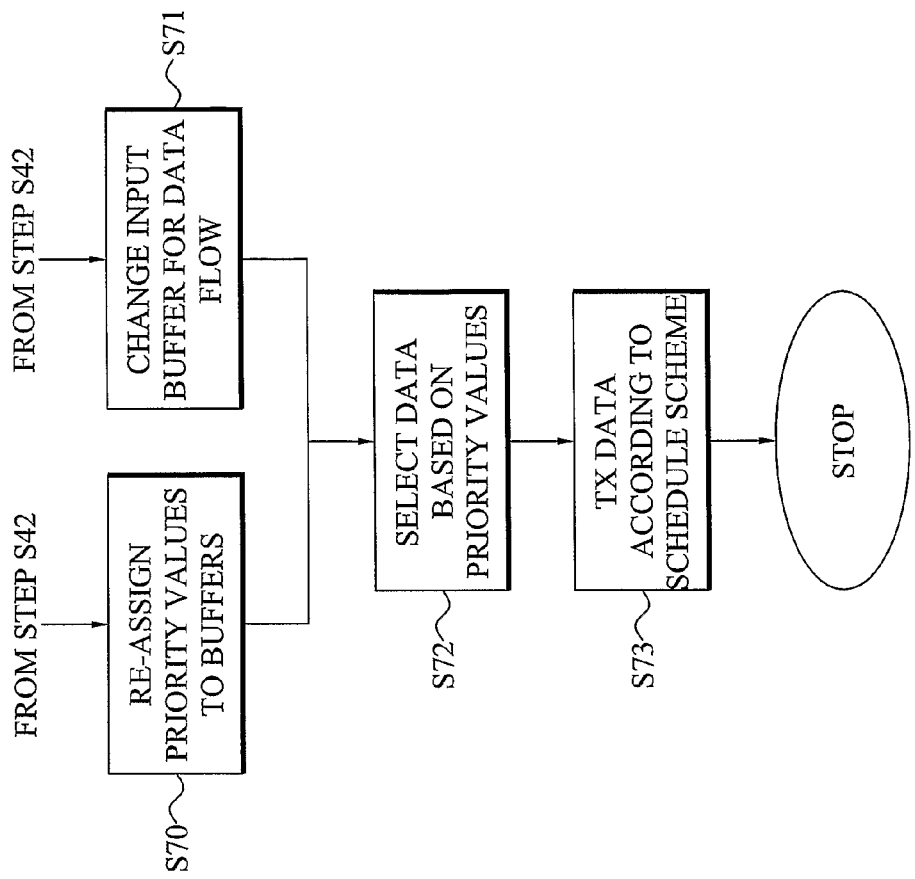
Fig. 8
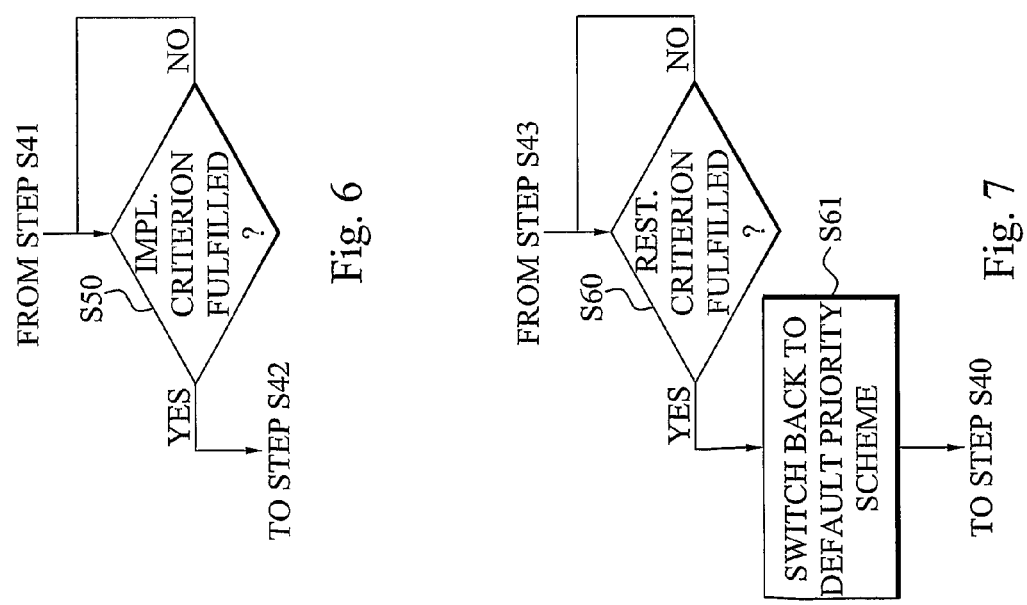
Fig. 6
Fig. 7

METHOD AND DEVICE FOR CONTROLLING DATA FLOWS AT COMMUNICATION TERMINALS

TECHNICAL FIELD

The present invention generally relates to traffic management in communication systems, and in particular to such a traffic management that results in a dynamic, local and temporary change in transmission pattern in communication systems.

BACKGROUND

Communication systems and networks are designed and dimensioned by operators to handle a particular average traffic situation. This means that the networks are dimensioned for a certain amount of traffic and configured to support a given mixture of application flows. In the communication networks of today, a vast range of different such applications flows can be present, where each flow has specific characteristics in terms of requirements on transport quality of service (QoS), but also in data packet size, length of data flow in time, traffic intensity spread over the day, etc. This information is utilized by the network operator to compile a traffic model, based on which the network is dimensioned and built.

This means that a particular communication network is designed for (effectively) handling a particular traffic model that typically represents the average expected traffic pattern in terms of the number and types of connected communication terminals and the number and types of data flows.

However, in wired and in particular wireless communication networks, the traffic pattern can dynamically and locally change over time implying that the actual traffic situation in a portion of the network can, at least temporarily, significantly diverge from the average expected traffic situation represented by the traffic model. As the communication network is not designed to effectively handle such a diverged traffic situation, the users will typically experience a reduced quality of service in terms of disconnected calls, prevention of access to the communication network, prevention of using certain applications/services and operation of applications/services at a low QoS.

Design of an appropriate traffic model becomes even more challenging for the network operators today with the increase in the number of available application and service data flows and different user terminal types that can be present in the network. For example, traditionally a regular voice or conversational service was a single uniform communication service in wireless radio-based systems. However, today the network operators and service providers can offer different QoS levels and usages for such voice services. A user having a "gold" subscription with the operator could be prioritized higher than a "regular" user. This means that even though similar data flows originate from the gold and regular user, the network should handle these flows differently by giving priority to the former, possible at expanse of the latter.

Also the new IP-based services, such as Web browsing, multimedia services, etc. emerging in different wireless communication networks render it more difficult to optimally design and manage communication networks.

The traditional approaches of coping with a divergence from the pre-defined traffic model in terms of a change in user behavior, number of connected users, type of connected users and distribution of application data flows to provide adequate QoS, at least to the prioritized users, include utilizing an admission control procedure. This means that a decision whether to accept or reject a new connection is made depending on the interference or load it adds to the existing connections. Such an admission control could also be made dependent on different QoS classes of the users, see the document [1].

This admission control can also be complemented with congestion control that is put into action when the admitted users cannot be satisfied with the normal agreed QoS due to an overload. In this congestion control, an update of the transmission scheduling schemes is typically employed as in the document [1]. This means that the time occasions allocated to particular users for data transmissions are reduced.

SUMMARY

The prior art solutions of combating and managing changes in the traffic pattern in a communication network are inflexible and not adapted to networks having communication terminals handling different application data flows. There is, thus, a need for a dynamic, temporary and local shaping of such communication networks to cope with the change in traffic pattern and data flow distribution.

The present invention overcomes these and other drawbacks of the prior art arrangements.

It is a general object of the present invention to provide a shaping of the traffic pattern in a communication system.

It is another object of the invention to provide a possibility of locally, temporarily and dynamically changing the resource allocation among different communication service and application flows.

Yet another object of the invention is to provide a dynamic, local and temporary switch of transmission prioritizing profiles for data flows, which results in a temporary switch of data transmission pattern in a portion of a communication system.

These and other objects are met by the invention as defined by the accompanying patent claims.

Briefly, the present invention involves traffic management in a communication system comprising multiple communication terminals that each has data flows presented in transmit data buffers. The terminal further uses a default prioritizing scheme that assigns transmission priorities to the data flows/buffers and are used when selected which data to transmit at an allocated transmission occasion.

An event detector positioned in the communication system monitors the current traffic situation and distribution/pattern of the different application flows throughout the system. The traffic monitoring according to the present invention is preferably performed locally for different portions of the system. This means that a local traffic monitoring in a part of the system, e.g. in a few cells, a single cell or even part of a cell, is preferably conducted.

The event detector then detects a switching event that justifies a local shaping of the data flow distribution in a portion of the communication system. This event detection could be different criteria that are related to and reflect an estimated distribution of data flows in the system, preferably in a subportion of the system.

Once a switching event has been detected, a prioritizing scheme update message is generated. This update message comprises information of a temporary shaping or prioritizing scheme or profile that assigns temporary transmission priorities to data flows. When implemented in a communication terminal, the temporary prioritizing scheme will, due to the new assigned priorities, temporary change or switch the data transmission pattern and data flow distribution in a portion of the communication system in which the relevant terminal is (terminals are) present.

This means that the prioritizing scheme update message will command a communication terminal receiving the message to dynamically switch, during operation and based on the message, to the temporary prioritizing scheme that assigns temporary transmission priorities to the data flows present in the data buffer(s) of the terminal.

This message transmission can be sent to all terminals in the sub-portion of the system, in which the traffic monitoring and switching event detection has been performed. However, it is possible that the update message is only transmitted to a selected amount of terminals in the sub-portion. This means that if the switching event is detected based on information of an estimated distribution of data flows in a first portion of the system, the update message is sent to terminals in a second portion of the system to obtain a temporary switch of data transmission pattern in this second portion. This first portion is then preferably a sub-portion of the whole communication system and the second portion could be equal to the first portion or be a sub-portion of the first portion.

Once the traffic situation anew has changed, the communication terminal will stop employing the temporary prioritizing scheme and return to the default prioritizing scheme or possible a new temporary prioritizing scheme that is better adapted to the changed traffic situation.

In a particular embodiment, different prioritizing schemes according to the present invention are determined or designed. These schemes should be adapted to different traffic situation that are likely to occur during operation of the network. Suitable schemes could be adapted for a situation with a particular large amount of multimedia traffic and low conversational traffic, a situation with much control signaling, a situation with almost exclusively conversational or voice related data flows, etc. It is evident that this scheme design can be performed in response to a coming special event, e.g. a large sports event, which will lead to a change in the average number of active terminals and the type of services employed by the terminals and, therefore, a change in data flow pattern in a portion of the system.

Switching events or criteria are selected for the designed prioritizing schemes. These events should represent appropriate occasions at which a particular temporary prioritizing scheme should be invoked and used by some communication terminals. In the case of a prioritizing scheme adapted for a large amount of multimedia traffic, a switching event could be based on the total number of multimedia requests from terminals during a given period of time and/or an estimate of the total number of simultaneously ongoing multimedia sessions in a part of the system. For the case with a priority scheme adapted for a particular coming special event, the switching criterion could then be the time instance at which the special event is started.

In a preferred embodiment, each prioritizing scheme is, in addition to a switching event, preferably associated with and assigned a duration value or restoring criterion/event, defining for how long the temporary prioritizing scheme should be invoked. A duration value could be used for the case with the special event so that the temporary prioritizing scheme that is adapted to the traffic situation during the event will no longer be utilizes once the special event has been ended. A restoring criterion could be reception of a scheme restoring message, commanding a terminal to switch back to the default prioritizing scheme.

Information of the designed prioritizing schemes and selected switching events are then stored in a traffic manager in the communication system. Information of the designed priority schemes can be distributed to communication terminals in the system. By distributing information of the available temporary prioritizing schemes, the relevant communication terminals already in beforehand has the required information for invoking and using a particular temporary prioritizing scheme. This means that the priority scheme update message does not have to contain all detailed information of a temporary prioritizing scheme to use. Instead an identifier or other information that allows the terminal to identify which of the previously received prioritizing scheme to now temporarily use for data transmission is adequate.

The communication terminals could be configured for implementing and start using the temporary prioritizing scheme notified in the update message directly following reception of the message. Alternatively, the new scheme is only used when an implementation criterion is fulfilled. This criterion could be the reception of an implementation message from the traffic manager or the lapse of given period of time following reception of the update message.

In either case, once the communication terminals implements the temporary prioritizing scheme it could do this by allocating different priority values to the transmit buffers in which the data flows are temporary stored before transmission. At allocated transmission occasions, as determined by a schedule scheme, data is fetched from the transmit buffer according to the new assigned priority values. In an alternative embodiment, the communication terminal switches, based on the temporary prioritizing scheme, the transmit buffer in which data of an application flow is to be entered. This means that data of an application flow that previously was entered in a transmit buffer with a low assigned priority value could now instead be entered in another transmit buffer with a correspondingly higher assigned priority values. Data is then fetched, at allocated transmission instances, based on the priority values of the buffers. In both these different embodiments, the result is the same, namely, that data of some application flows will be fetched and transmitted more often and thus will get a larger share of the allocated communication resources. From a system point of view, this will result in that the data transmission pattern in a portion of the system will be different as long as the temporary prioritizing scheme is used.

The invention offers the following advantages:
Improves the over-all interference situation in different sections or portions of a communication system;
Provides a possibility of temporary and locally changing the behavior and performance of the data flows in terms of retainability, availability, immediacy and delay in a communication system;
The network operators and the end users are given increased performance and a more fine-grained differentiation;
The invention introduces the possibility of dynamic differentiation by making it possible for the network operators to differentiate by utilizing the flexibility/elasticity of different services and subscriber classes;
At a system level the capacity in number of admitted users of a particular service class can be increased during peak hours; and
For individual users, the denial of service ratio is decreased and the quality of service for most important traffic is increased.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating an embodiment of a traffic managing method according to the present invention;

FIG. 2 is a flow diagram illustrating additional steps of the traffic managing method of FIG. 1;

FIG. 3 is a flow diagram illustrating an additional step of the traffic managing method of FIG. 1;

FIG. 6 is a flow diagram illustrating an additional step of the traffic managing method of FIG. 5;

FIG. 7 is a flow diagram illustrating additional steps of the traffic managing method of FIG. 5;

FIG. 8 is a flow diagram illustrating the using step of FIG. 5 according to embodiments of the present invention;

DETAILED DESCRIPTION

Figure 4:
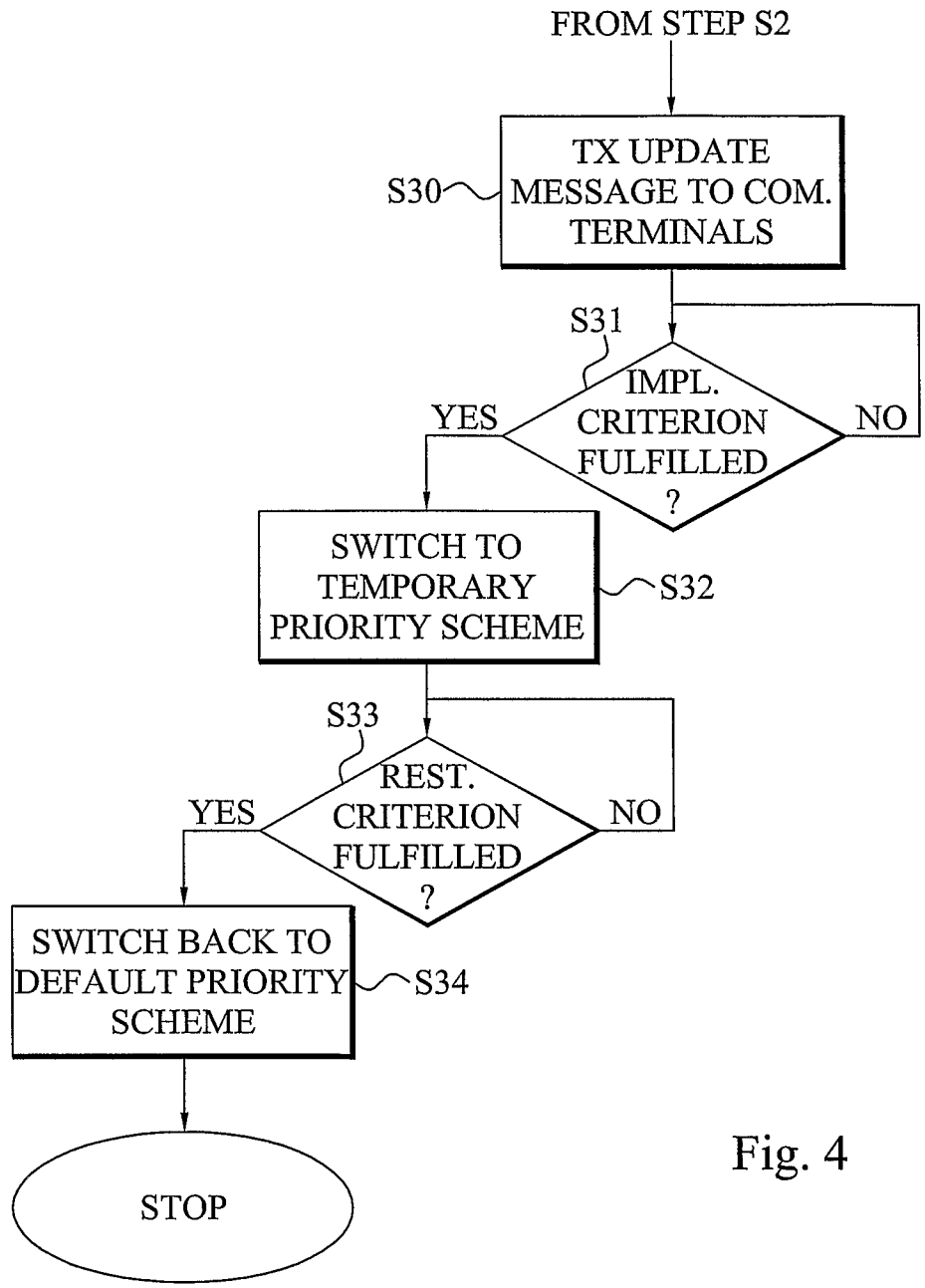
FIG. 4 is a flow diagram illustrating additional steps of the traffic managing method of FIG. 1.

Throughout the drawings, the same reference characters will be used for corresponding or similar elements.

The present invention relates to traffic management in communication systems and networks and in particular to techniques for managing and combating situations in which the current traffic pattern in the systems differs significantly from the pre-defined traffic model based on which the systems are designed and dimensioned.

In clear contrast to the prior art admission and congestion control solutions, the present invention provides a local, temporary and dynamic shaping of the traffic pattern in a communication system or network by composing and utilizing so-called prioritizing or shaping profiles/schemes for at least a portion of the active communication terminals in the system.

The shaping is local in that it typically only affects a portion of the communication system or more correctly communication terminals present in a portion of the system. For example, in the case of a wireless cellular communication system, the traffic shaping of the present invention can then be applied in a few cells or a single cell of the system. In addition, it could also be possible to affect only a selected set of communication terminals that are present in a portion of a single cell. In summary, the traffic shaping described herein is only applied to those portions of the communication system where problems, in terms of unfavorable traffic pattern, occur. This means that for other portions of the system, in which the current traffic situation fits well with the pre-defined traffic model, no shaping is necessary.

The shaping is furthermore dynamic in the sense that it is conducted during operation and directly affects those communication terminals that transmit and receive data. The priority profiles of the present invention are therefore utilized by communication terminals that are already connected to the system and involved in different communication services. This is in clear contrast to the prior art admission control, which mainly operates on communication terminals not yet connected to the system and decides whether to allow them access or not. However, it is evident to the skilled person that even though the shaping and prioritizing profiles of the invention are to be used by already connected and active communication terminals, the traffic shaping that will result from such a usage will be beneficial to terminals not yet connected to the systems since the likelihood that they are granted access will typically increase.

The traffic shaping is also temporary and momentary implying that the shaping and prioritizing profiles of the invention are temporarily used and used only when they are needed. This means that when the actual traffic situation or pattern has changed back to be handled efficiently by the pre-defined traffic model and network dimensioning, the relevant communication terminals stop using the temporary prioritizing profiles.

The present invention therefore provides a very efficient and flexible technique for managing changes in the traffic situation in a network when it is needed and where it is needed.

The present invention is applicable to a communication system or network that comprises communication terminals that manage multiple, i.e. at least two, different data flows. The communication system could be a wired system but the present invention is in particular suitable for implementation in a wireless communication system. This is because the user mobility of such systems can lead to vastly varying traffic patterns as users move into and out from different parts of the system.

Prior art traffic managing techniques often utilizes a transmission scheduling control or congestion control. In such a scheduling control, a control node in the communication system changes the time instances at which a communication terminal may transmit data. For example, in a Wideband Code Division Multiple Access (WCDMA) based system, user terminals request transmission grants from a Node B. The Node B in turn grants transmission according to a Node B application part (NBAP) control message generated by a Radio Network Controller (RNC). This means that the time occasions at which user terminals may access the (radio) transport resources and transmit data are defined and scheduled in the NBAP control message, which therefore functions as a transmission schedule scheme or profile. In a congestion situation, the RNC can send a new NBAP control message (schedule scheme) that is adapted to and generated to combat the congestion situation.

In clear contrast to this transmission scheduling, the present invention updates and temporarily changes the priorities of the different data flows in communication terminals. According to the invention, such a communication terminal then comprises one or multiple transmit buffers that temporarily store data to be transmitted through the communication system to other terminals. In addition, the transmit buffers store data originating from different applications. This means that a communication terminal manages data packets belonging to several communication services or applications. The data packets of a particular application or service are together handled and organized, in the present description, as a data flow.

The different data flows have different requirements in terms of acceptable delay, minimum bit rate and other QoS-related parameters. In addition, the data flows affect other communication terminals and the general traffic pattern in the part of the system where the communication terminal is present. Different application flows typically have different impact on other terminal and traffic pattern, due to differences in packet size, length of flow in time and amount of data that is generally transmitted.

As a consequences, a given distribution or pattern of application flows will have different demands on resources, will generate different interference levels and will be handled better or worse by the system than another distribution or pattern of application flows.

The present invention utilizes these different characteristics of application or data flows by temporarily changing the priority scheme utilized by the communication terminals for determining which data flow to transmit at a given time instance (as determined by a schedule scheme).

In a typical situation, a communication terminal could include, for example, three transmit buffer (denoted I, II, III) that each comprises data of a respective application flow. The communication terminal utilizes a default prioritization scheme or profile when determining which data type to transmit. A typical example of such a default prioritizing scheme is to employ equal priority or weights to the transmit buffers so terminal will transmit data according to the following scheme: I, II, III, I, II, III, I, II, III, I, II, III. This means that ⅓ of the radio resources are used per transmit buffer. Note that the default priority scheme merely specify from which transmit buffer data should be fetched at a transmit occasion and not when to transmit data as this is defined by a scheduling scheme.

The present invention then temporarily switches priority schemes to cope with the current or expected traffic situation. For example, in such a case, the terminal could fetch data from the three transmit buffers according to the temporary priority scheme: I, I, II, I, I, III, I, I, II, I, I, III. In this case, the first transmit buffer will get ⅔ of the resources, leaving ⅓ of the resources that are split equal among the remaining to buffers. This temporary priority scheme is, thus, particular suitable for a traffic situation where the communication terminals are expected to transmit much data according to the communication service or application flow present in the first buffer.

The present invention will now be further described with reference to FIG. 1 which is a flow diagram of a traffic managing method according to an embodiment of the present invention. In this method, a communication system has a number of connected communication terminals that are involved in different communication services and therefore transmit data of different application flows. At least a portion of the communication terminals have multiple such application flows present in at least one transmit buffer. These communication terminals transmit data at assigned transmission occasions (as defined by a schedule scheme), where the data is selected and fetched from the at least one transmit buffer based on a default priority scheme. Note further that not all these terminals need to employ a same default priority scheme but could possibly each utilize a specific default priority scheme.

An event detector positioned in the communication system monitors the current traffic situation and distribution/pattern of the different application flows throughout the system. This monitoring can be performed by continuously monitoring the traffic, intermittently/periodically monitoring the traffic or monitoring the traffic at pre-defined time occasions. The traffic monitoring according to the present invention is preferably performed in different portions of the communication system. This means that a local traffic monitoring in a part of the system, e.g. in a few cells, a single cell or even part of a cell, is preferably conducted.

In a first step S1, this event detector detects a switching event that justifies a local shaping of the data flow distribution in a portion of the communication system. This event detection could be different criteria that are related to and reflect an estimated distribution of data flows in the system, preferably in a sub-portion of the system. Typical such switching or triggering events include high detected interference levels in a cell or a particular network area. For example, the total interference level in the sub-portion of the system could exceed a given threshold. Alternatively, interferences arising from different application flows could be monitored and compared to different application or service specific thresholds. Further suitable switching events include that total number of communication terminals or total number of active terminals in the sub-portion of the system. In a more refined and preferred embodiment, the distribution of the actual application flows from these communication terminals are monitored and a switching criterion is fulfilled if e.g. the total number of simultaneous flows of a particular application or service exceeds a predefined threshold.

The switching event detection performed in step S1 could, thus, be based on a particular monitoring of the actual distribution of data flows in a sub-portion of the system. However, it is also possible to detect a switching event based on an estimation of the distribution of data flows. This means that the operator can have knowledge of that a markedly change in the traffic situation and data flow distribution is to be expected in a portion of the system during a period of time. This could be the case, where e.g. a live football match is played in a stadium. It can then be expected that there will be a temporary increase in multimedia data downloading in the area around the stadium due to users wanting to view the football match live on their user terminals or view replays of scored goals, etc.

As is evident from the discussion above, the event detection according to the invention can be based on a monitoring on the actual traffic pattern or based on fulfillment of a pre-defined switching criterion.

Once a switching event has been detected in step S1, a prioritizing scheme update message is generated in step S2. This update message comprises information of a temporary shaping or prioritizing scheme/profile that assigns temporary transmission priorities to data flows. When implemented in a communication terminal, the temporary prioritizing scheme will, due to the new assigned priorities, temporary change or switch the data transmission pattern and data flow distribution in a portion of the communication system in which the relevant terminal(s) is (are) present.

This means that the prioritizing scheme update message will command a communication terminal receiving the message to dynamically switch, during operation and based on the message, to the temporary prioritizing scheme that assigns temporary transmission priorities to the data flows present in the data buffer(s) of the terminal.

Once the traffic situation anew has changed, the communication terminal will stop employing the temporary prioritizing scheme and return to the default prioritizing scheme or possibly a new temporary prioritizing scheme that is better adapted to the changed traffic situation.

As was discussed in the foregoing, the present invention is applied to those portions of the system where a change in data flow distribution requires an update of the assigned priorities to the flows and is applied when it is needed. This is schematically illustrated by the line L1, which implies that once a new, possible different, switching event is detected in step S1, a new priority scheme update message is generated in step S2 and implemented in at least one communication terminal in the system.

The method then ends.

FIG. 2 is a flow diagram of additional steps of the traffic managing method of FIG. 1. These additional steps are typically performed during the design, assemble and deployment phases whereas the steps of FIG. 1 could be regarded as performed during the actual operation phase.

The design phase can be performed as a part of the operator's procedure in dimensioning and designing the communication network. Alternatively, the design phase could be performed also once the actual network has been put into operation. In this design phase, different prioritizing or shaping schemes according to the present invention are determined or designed in step S10. These schemes should be adapted to different traffic situation that are likely to occur during operation of the network. Suitable schemes could be adapted for a situation with a particular large amount of multimedia traffic and low conversational traffic, a situation with much control signaling, a situation with almost exclusively conversational or voice related data flows, etc. It is evident that this scheme design can be performed in response to a coming special event, e.g. a large sports event, which will lead to a change in the average number of active terminals and the type services employed by the terminals and, therefore, a change in data flow pattern in a portion of the system.

In a next step S11, switching events or criteria are selected for the designed prioritizing schemes. These events should represent appropriate occasions at which a particular temporary prioritizing scheme should be invoked and used by some communication terminals. In the case of a prioritizing scheme adapted for a large amount of multimedia traffic, a switching event could be based on the total number of multimedia requests from terminals during a given period of time and/or an estimate of the total number of simultaneously ongoing multimedia sessions in a part of the system. For the case with a priority scheme adapted for a particular coming special event, the switching criterion could then be a time instance in connection with the start of the special event is started.

In a preferred embodiment, each prioritizing scheme is, in addition to a switching event, preferably associated with and assigned a duration value or restoring event, defining for how long the temporary prioritizing scheme should be invoked. A duration value could be used for the case with the special event so that the temporary prioritizing scheme that is adapted to the traffic situation during the event will no longer be utilized once the special event has been ended. A restoring event could be reception of a scheme restoring message, commanding a terminal to switch back to the default prioritizing scheme. This is discussed in more detail further below.

Information of the designed prioritizing schemes and selected switching events are then associatively stored, preferably in a control node in the system in step S12. Associatively stored implies that there is a connection between a priority scheme and the information of the switching event selected for that particular event. Thus, it is, due to the association, later possible to retrieve a particular prioritizing scheme and information of its selected switching event. The steps S11 and S12 could be regarded as part of the assemble phase.

In a next step S13, the deployment phase, information of the designed priority schemes are distributed to communication terminals in the system. This means that communication terminals present in the communication system will receive information of the different available temporary prioritizing schemes and preferably store them for a possible later use. The control node managing this scheme distribution could simply send this information as a broadcast message to all terminals in the system. However, it could be possible that the priority schemes or at least a portion thereof are only relevant for a part of the system. In such a case, the information could be sent (broadcast, multicast or unicast) to terminals present in that part. It is also anticipated by the invention that not all terminals in the system or the selected part of the system must necessarily receive the same scheme information. For example, a set of the designed prioritizing schemes could be applicable only in particular terminal models and types, e.g. multimedia capable user terminals. This means that information of such prioritizing schemes need only be sent to terminals that can actually employ them.

The method then continues to step S1 of FIG. 1. By distributing information of the available temporary prioritizing schemes, the relevant communication terminals already in beforehand have the required information for invoking and using a particular temporary prioritizing scheme. This means that the priority scheme update message generated in step S2 of FIG. 1, does not have to contain all detail information of a temporary prioritizing scheme to use. Instead an identifier or other information that allows the terminal to identify which of the previously received prioritizing scheme to now temporarily use for data transmission is adequate.

FIG. 3 is a flow diagram illustrating an additional step of the traffic managing method of FIG. 1. This additional step S20 basically illustrates one embodiment of the traffic monitoring that can be utilized as basis for detecting a switching event. As was mentioned in the foregoing, the distribution of data flows in a sub-portion of the system is preferably estimated and utilized to elucidate whether a switching criterion is fulfilled. This distribution of flows could thus be an estimate but also more correctly reflect the current or actual flow distribution. Furthermore, the different possible data flows can be grouped into different QoS classes based on their respective QoS requirements and characteristics. The event detection can then be based on information of an expected or current distribution of data flows belong to different QoS classes in the sub-portion of the system. The method then continues to step S1, where the switching event is detected.

The traffic management method according to the present invention and described above in connection with FIGS. 1 to 3 is typically implemented in a control network node in the communication system. For example, the method could be implemented in a RNC or Base Station Controller (BSC) node. However, the method could also be implemented in other network nodes, e.g. base stations, which will then include at least a portion of the network operation and traffic management functionality. It is even possible, e.g. in ad hoc networks, to implement at least some of the functional features defined above in mobile communication terminals.

FIG. 4 is a flow diagram illustrating additional steps of the traffic managing method of FIG. 1. The method continues from step S2 in FIG. 1. In a next step S30, the generated prioritizing scheme update message is transmitted to receiving communication terminals. This message transmission can be sent to all terminals in the sub-portion of the system, in which the traffic monitoring and switching event detection has been performed. However, it is possible that the update message is only transmitted to a selected amount of terminals in the sub-portion. This means that if the switching event is detected based on information of an estimated distribution of data flows in a first portion of the system, the update message is sent to terminals in a second portion of the system to obtain a temporary switch of data transmission pattern in this second portion. This first portion is then preferably a sub-portion of the whole communication system and the second portion could be equal to the first portion or be a sub-portion of the first portion.

The update message could be sent to only a single communication terminal, but is in most cases, sent to multiple communication terminals in the second portion of the system. This sent update message could then be the same for all the terminals, implying that they will temporarily employ the same temporary prioritizing scheme. Alternatively, different update messages comprising different prioritizing schemes or identifiers thereof can be sent to different terminals, implying that they will temporarily employ different prioritizing schemes. In this context, it is evident that a single update message could be sent to multiple terminals but commanding different receiving terminals to temporarily invoke different prioritizing schemes.

In a next optional step S31, a communication terminal receiving an update message investigates whether a scheme implementation criterion is fulfilled. This implementation criterion is associated with the particular temporary prioritizing scheme the terminal is about to use. In a first embodiment of the invention, this implementation criterion is simply reception of the prioritizing scheme update message. In such a case, the terminal will start using the temporary prioritizing scheme notified in the message directly upon reception of the message. However, in alternative embodiments, the control node first detects, through the switching event, that a prioritizing scheme update will be necessary in a period of time and then generates and transmits the update message. However, the notified temporary prioritizing scheme is not to be utilized directly by the terminals but first when needed as defined by the implementation criterion.

In an embodiment of the invention, this implementation criterion is reception of a scheme implementation message from the control node. In such a case, the control node has determined that it is now time for the relevant terminals to start using the temporary prioritizing scheme and therefore generates the implementation message and transmits it to the terminals. It is therefore possible that not all terminals that have received an update message are to start using the temporary prioritizing scheme simultaneously. This solution therefore provides an even finer grade of flexibility by differentiating between the scheme invoking times of different communication terminals to provide traffic management that is as closely adapted to the current traffic situation as possible.

In another embodiment, the implementation criterion is fulfilled after the lapse of a given period of time from the reception of the update message. Once this period of time has lapsed, the terminal will start using the temporary prioritizing scheme.

In yet another embodiment, the communication terminal itself monitors the local traffic situation and the implementation criterion will be fulfilled once a given traffic distribution is detected.

In either case, the particular implementation criterion (if any) to use for a particular temporary prioritizing scheme is preferably determined as a part of the design phase and is typically notified in the update message.

In this step S31, the terminal awaits fulfillment of the implementation criterion and once it has been fulfilled, the terminal switches to the temporary prioritizing scheme and start using it for data transmission in step S32. This means that the different data flows (simultaneously) handled by the terminal and present in its transmit buffer(s) are associated with new priority values as defined by the temporary scheme or profile. As is evident from its designation, the temporary prioritizing scheme is regarded as an auxiliary scheme that is to be employed temporarily and only when the current traffic situation demands a change in prioritizing of the different data flows. Once this "special" traffic situation is ended and the traffic pattern returns to "normal", the temporary prioritizing scheme should no longer be used, but instead be exchanged by the default scheme normally utilized by the terminal.

In a next step S33, the terminal investigates whether a scheme restoring criterion is fulfilled so that it should stop employing the temporary prioritizing scheme and instead use the default scheme. This restoring criterion could, in correspondence with the implementation criterion, be the lapse of a given period of time following the reception of the update message or the start time of employing the temporary prioritizing scheme. Alternatively, the restoring criterion could be the reception of a scheme restoring message from the control network node. Once this restoring criterion is fulfilled, the communication terminal switches back to and start to use the default priority scheme in step S34. The method then ends.

Figure 5:
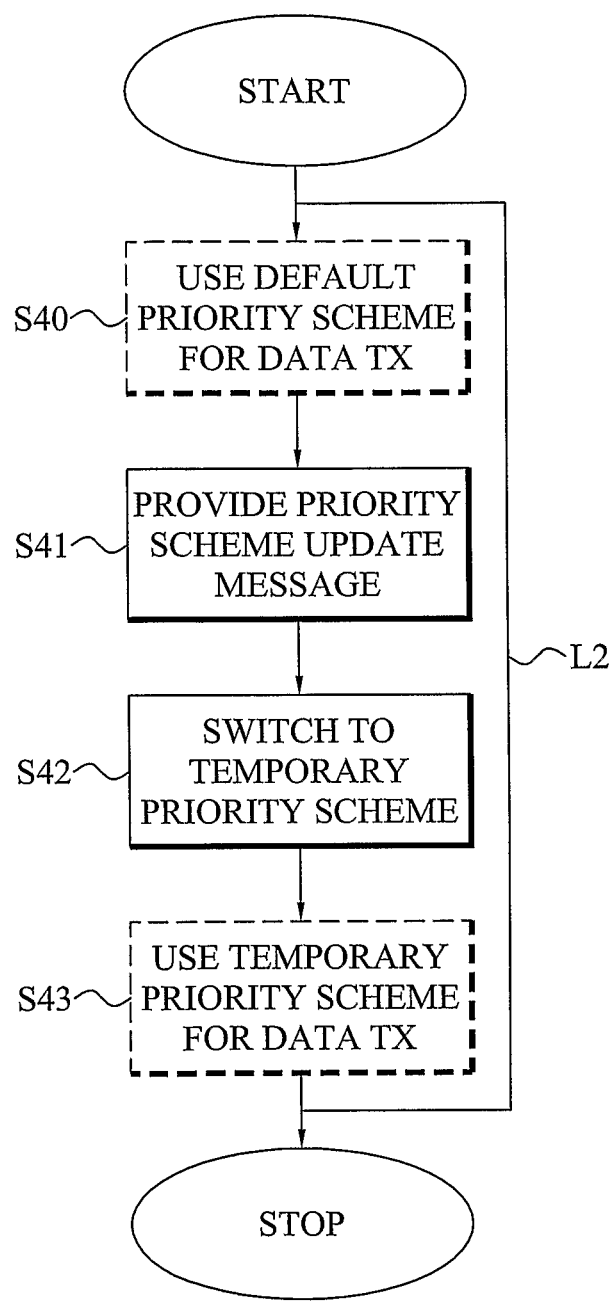
FIG. 5 is a flow diagram illustrating another embodiment of a traffic managing method according to the present invention.

FIG. 5 is a flow diagram illustrating a traffic managing method implementable in a communication terminal according to the present invention. This communication terminal has multiple different service or application flows present in at least one transmit buffer, typically one such buffer per data flow. Each data flow (or likewise each transmit buffer if each buffer temporary stores data of only a single given application flow) is assigned a priority value according to a default prioritizing scheme. The terminal then utilizes this default prioritizing scheme in step S40 for determining which data packets to send at given or assigned transmission occasions. A typical such default scheme could assign equal priority values to the different flows so that they will all utilize an equal share of the communication resources. As has been pointed out in the foregoing, the (default) prioritizing scheme is utilized by the terminal for selecting from which transmit buffer data packets should be fetched at a transmit occasion, whereas such a transmit occasion is determined by a scheduling scheme.

In a next step S41, the communication terminal provides a prioritizing scheme update message, implying that a new prioritizing scheme is to be temporarily used in the data transmission. This message provision is preferably realized as the reception of the update message from a remote control network node. However, in particular in the case of a communication node in the form of a base station, the traffic control and update message generation functionality can be implemented in the particular terminal implying that the prioritizing update message is forwarded from the message engine to the priority scheme manager within the same node.

As was discussed in the foregoing, the update message could include a more complete description of the temporary prioritizing scheme or, in the case this information already has been provided to the terminal, e.g. in the form of a scheme information distribution message or a prior update message, an identifier of the temporary prioritizing scheme. Further associated auxiliary information, e.g. implementation criterion, restoring criterion, etc. could also be included in the message.

The communication terminal switches to this temporary priority scheme in step S42 and uses the new priority values when transmitting data in step S43. The temporary prioritizing scheme typically results in that some of the data flows are assigned more radio resources (higher priority values) and other flows are assigned fewer resources (lower priority values) as compared to the default prioritizing scheme.

Once the limited period of time during which the temporary prioritizing scheme is to be employed has lapsed, the communication terminal switches back to the default prioritizing scheme (unless it receives a new update message) and uses this default scheme for the subsequent data transmission, which is schematically illustrated by the line L2.

FIG. 6 is a schematic block diagram of an additional step of the traffic managing method of FIG. 5. The method continues from step S41 of FIG. 5. In a next step S50, the communication terminals investigates whether an implementation criterion associated with the temporary prioritizing scheme is fulfilled. This step basically corresponds to step S31 in FIG. 4 and is not further discussed. If the criterion is fulfilled, the method continues to step S42 of FIG. 5, where the terminal switches to and implements the temporary prioritizing scheme.

FIG. 7 is a schematic block diagram of an additional step of the traffic managing method of FIG. 5. The method continues from step S43 of FIG. 5. In a next step S60, the communication terminals investigates whether a restoring criterion associated with the temporary prioritizing scheme is fulfilled. This step basically corresponds to step S33 in FIG. 4 and is not further discussed. If the criterion is fulfilled, the terminal switches back to the default prioritizing scheme in step S61. The method then continues to step S40 of FIG. 5, where the terminal uses this default prioritizing scheme for data transmission.

FIG. 8 is a schematic block diagram illustrating possible embodiments of the using step S43 of FIG. 5. The method continues from step S42 of FIG. 5. In these embodiments it is assumed that the communication terminal has a transmit buffer for each application flow or at least for each set of application flows that can be regarded to belong to a same QoS class.

In a first embodiment as represent by step S70, the communication terminals re-assigns priority values to the transmit buffers based on the information of the temporary prioritizing scheme to employ. In this priority re-assigning, the priority values of all buffers could be updated or changed or only the priority value of one or a subset of the buffers.

In a second embodiment illustrated by the step S71, the communication terminal changes, based on the information of the temporary prioritizing scheme, the transmit buffer, in which data of at least one of the application flows is entered. This means that an application flow that has become prioritized in the temporary prioritizing scheme should then be entered in a transmit buffer that has a high associated or assigned priority value. For example, assume a terminal having three transmit buffers denoted I, II and III and with assigned priority values $\omega_1$, $\omega_2$ and $\omega_3$, respectively, and where $\omega_1 > \omega_2 > \omega_3$. The first transmit buffer I would then be assigned $$\frac{\omega_1}{\omega_1 + \omega_2 + \omega_3}$$

of the transmit occasions (assigned transport resources), the second II and third III buffer would then be assigned $$\frac{\omega_2}{\omega_1 + \omega_2 + \omega_3} \text{ and } \frac{\omega_3}{\omega_1 + \omega_2 + \omega_3}$$

of the resources, respectively.

Data of an application flow that is low prioritized according to the default prioritizing scheme should then typically be entered in the third transmit buffer III. If this application flow becomes higher prioritized according the temporary prioritizing scheme, the data of the flow should then instead be entered in the second II or even first I transmit buffer.

The two embodiments disclosed in step S70 and S71 would typically give the same result and the particular implementation solution one adopts typically depends on the characteristics of the particular communication terminal.

In either case, in a next step S72, the communication terminal selects and fetches data based on the priority values assigned to the different transmit buffers. The fetched data is then sent at a transmission occasion determined according to a schedule scheme in step S73. This could be performed so that the terminal requests transmission occasions from a network node that grants them according to the schedule scheme. Alternatively, the communication terminal has received a schedule scheme and uses it for determining when it can transmit data. The method then ends.

The local, dynamic and temporary switch of prioritizing schemes according to the present invention can therefore be performed instead of different admission control techniques or congestion control techniques that operates by modifying and changing the schedule scheme used for assigning transmission instances to communication terminals. However, the present invention can alternatively advantageously be used as a complement to such schedule scheme modifying solutions. In such a case, both the used prioritizing schemes and schedule scheme could be switched in response to changes in the traffic situation in parts of the communication network.

Figure 9:
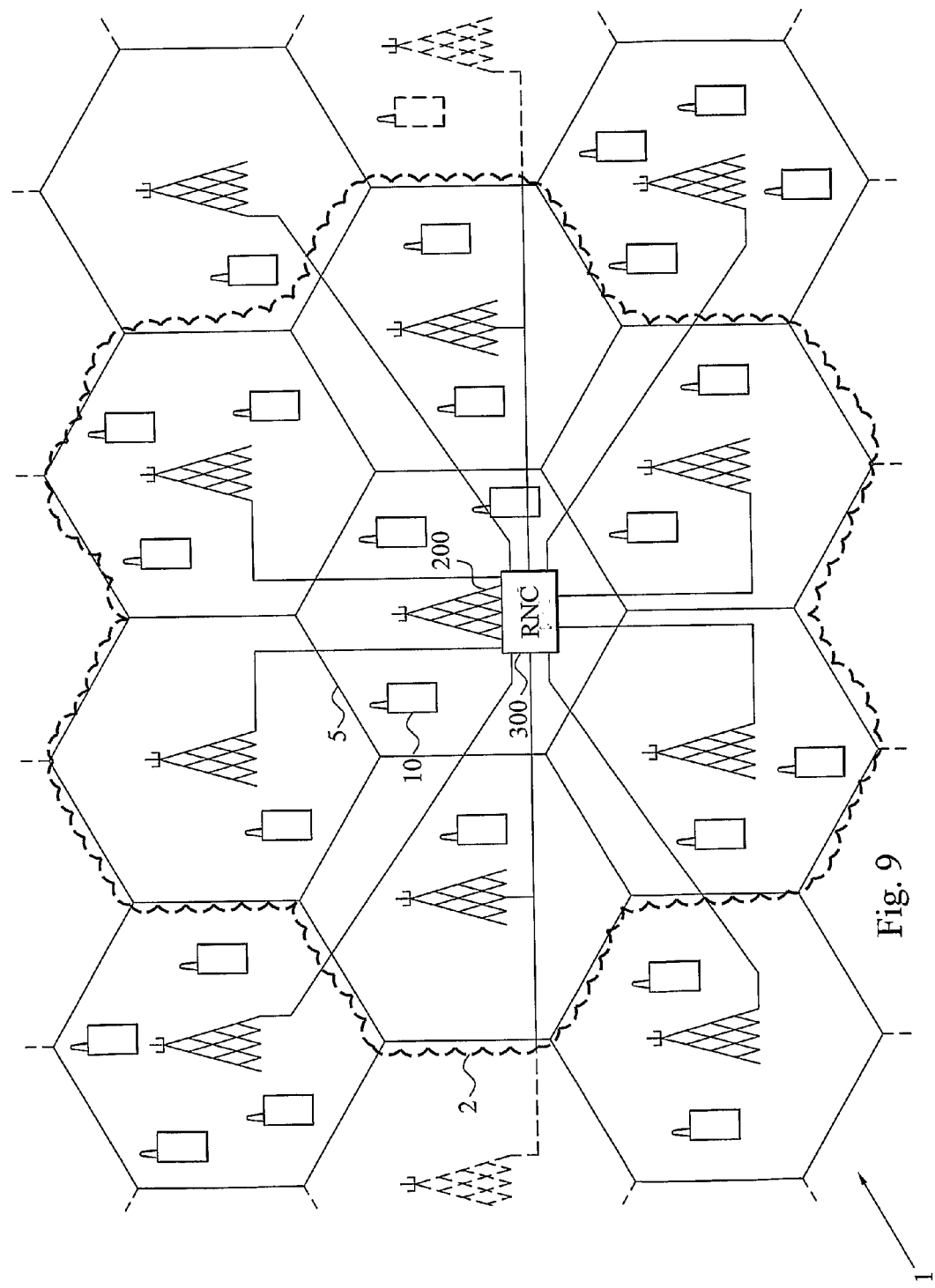
FIG. 9 is a schematic overview of a communication system to which the teachings of the present invention can be applied.

FIG. 9 is a schematic overview of a communication system 1 to which the teachings of the present invention can be applied. The communication system 1 is a wireless radio-based cellular system comprising multiple cells 5 each managed by a Node B or base station 200 that provides communication services within the area of the cell 5. A multitude of user terminals 10 are present in different cells 5 of the system 1 and are involved in different communication services with connected base stations 200. The user terminals 10 transmit data selected, if the terminal 10 has data of different application flows, based on a default prioritizing scheme at time instances defined by a schedule scheme. A control node, represented by a RNC 300, is connected to a number of the base stations 200 and manages the data traffic in the area served by these base stations 200.

In the traffic management according to the present invention, the RNC 300 detects a switching event based on information of an estimated distribution of data flows in a first portion 2 of the system 1. This information can be gathered by the RNC 300 itself and/or be based on input information from the connected base stations 200 (or even user terminals 10). The RNC 300 then selects an appropriate temporary prioritizing scheme that is adapted to the traffic situation and data flow pattern in the first system portion 2. The update message is transmitted, possible via base stations 200, to (selected) user terminal 10 in a second portion 2; 5 of the system 1, e.g. in one cell 5 or in the same area 2 as for the traffic monitoring. The user terminals 10 starts to use the temporary prioritizing scheme and the transmission pattern and data flow distribution in this second system portion 2; 5 will change.

It is further anticipated by the present invention that since the base stations 200 manages multiple data flows, the update messages could, alternatively or in addition, be sent to these base stations 200, which then would employ the temporary prioritizing scheme of the invention. As a consequence, the temporary prioritizing scheme of the invention can be used for both uplink and downlink traffic.

Figure 10:
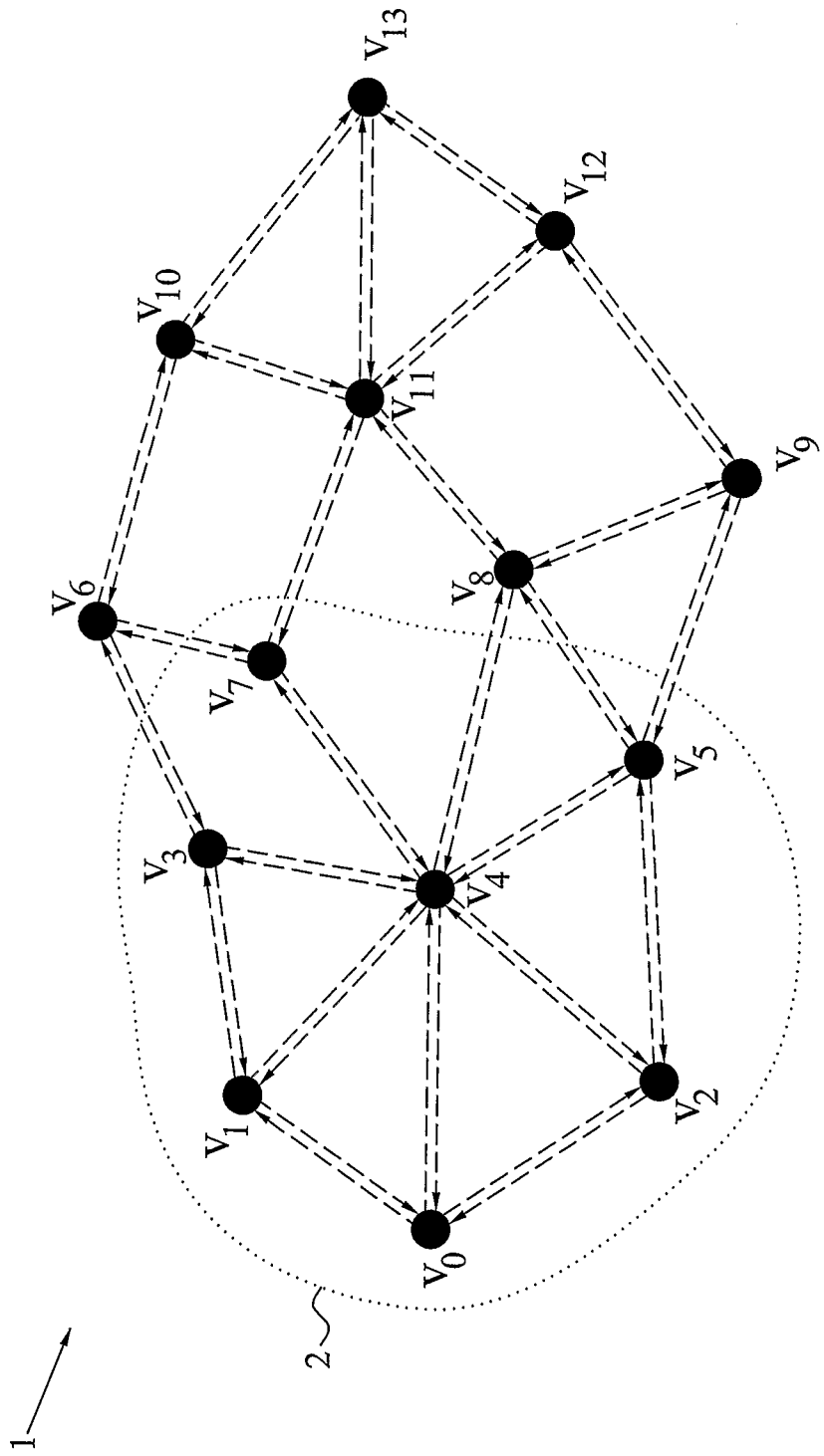
FIG. 10 is a schematic overview of another communication system to which the teachings of the present invention can be applied.

FIG. 10 is a schematic overview of another wireless radio-based communication system 1 to which the teachings of the present invention can be applied. This system 1 is a so-called ad-hoc network where no centralized node but the terminals $v_0$ to $v_{13}$ themselves decides how and when to transmit data. In such a case, the traffic managing features of the present invention are implemented in at least one of the mobile terminals $v_0$ to $v_{13}$. As is well-known in the art, in an ad-hoc system data present in a source node or terminal $v_0$ is transmitted to a destined node or terminal $v_{13}$ through multiple hops involving intermediate nodes or terminals. This means that a given node or terminal can, in its transmit buffers, have data of different application flows and originating from different source terminals. The communication system 1 can utilize priority schemes for handling these different application flows.

The local traffic monitoring and data transmission pattern change through usage of a temporary prioritizing scheme can be performed in a sub-portion 2 of the system 1 involving only some of all communication terminals $v_0$ to $v_{13}$.

Even though the present invention is in particular applicable to wireless communication systems, in which the mobility of communication terminals impose high demands on the adaptability of the system to different traffic situations, also fixed wireless and wired systems could benefit from employing the invention.

By employing the present invention, the over-all interference situation in the relevant portion of the communication system will improve. Furthermore, even though the present invention does not include any direct admission control, the switch to a temporary prioritizing scheme resulting in a change of the data transmission pattern in a portion of the system will increase the admission probability of user terminals and improve the quality for services of high prioritized traffic types. The network operators and the end users are given increased performance and a more fine-grained differentiation. The present invention provides a possibility of changing the behavior and performance of the data flows in terms of retainability, availability, immediacy, delay, etc. The invention also introduces the possibility of dynamic differentiation by making it possible for the network operators to differentiate by utilizing the flexibility/elasticity of different services and subscriber classes. The gain of the invention is seen both at a system level and for the particular users. At a system level the capacity in number of admitted users of a particular service class can be increased during peak hours. For a particular user, the denial of service ratio is decreased and the quality of service for most important traffic is increased.

Figure 11:
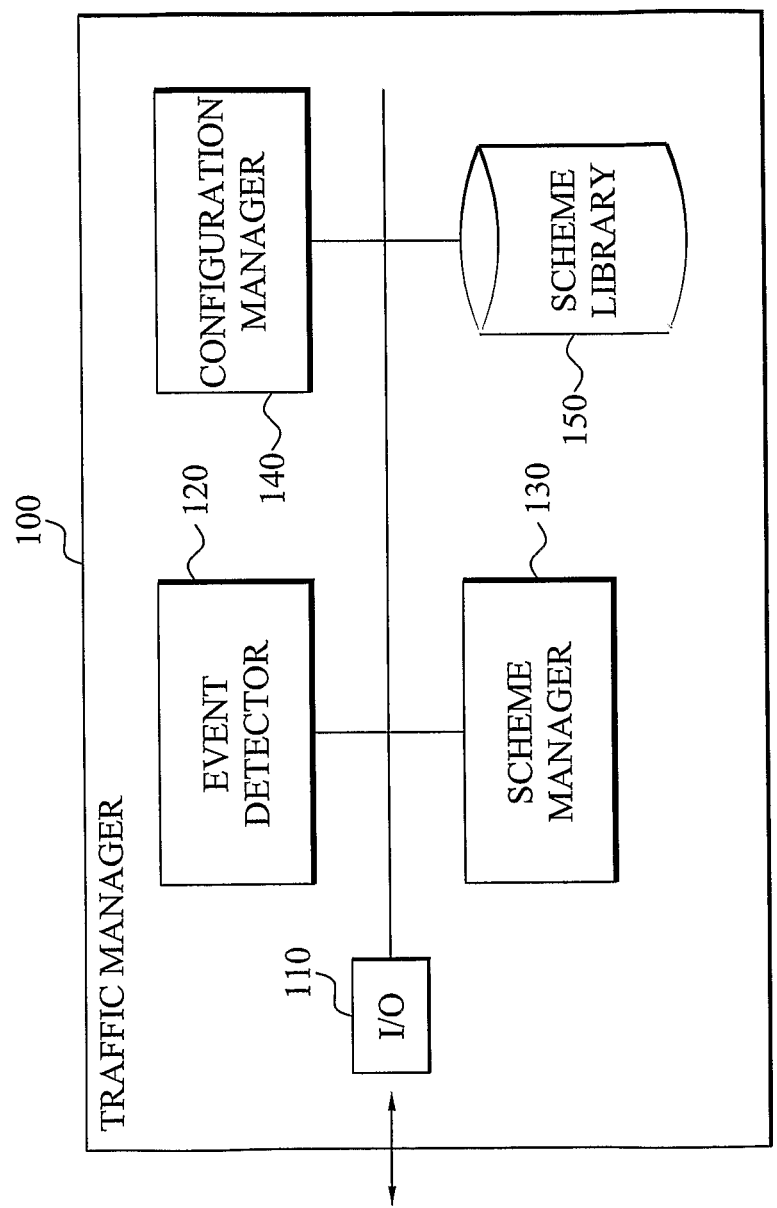
FIG. 11 is a schematic block diagram of a traffic manager according to an embodiment of the present invention.

FIG. 11 is a schematic block diagram of a traffic manager 100 according to an embodiment of the present invention. The traffic manager 100 comprises an event detector 120 that is arranged for detecting a switching event based on information of an estimated distribution of data flows in a portion of the communication system. This input information can be received by a general input and output (I/O) unit 110 from different "event sniffers" provided throughout the system. For example, the base stations or network nodes in the system, or at least a portion of these network nodes, could be employed for performing signal and interference measurements, collection of general traffic information, including current traffic pattern and distribution of application flows in different parts of the system, etc. Also information generated by mobile user terminals can be of value and utilized. This information is brought to the event detector 120 that determines whether a switching event or criterion is present based on the information. It is also anticipated by the invention that traffic monitoring functionality can also, or alternatively, be present in the traffic manager itself, in particular if the traffic manager is arranged in connection with one of the base stations in the system.

The event detector 120 is, thus, provided for scanning different events it has been tasked to look for. These possible different events have been defined by the network operator during a design phase and information of the events is stored in the event detector 120 or in a connected memory 150. Once the event detector 120 detects a particular switching event it generates a detection signal that is provided to a scheme manager 130 in the traffic manager 100. As different data flow distributions can trigger different switching events, the detection signal generated by the event detector 120 preferably includes information of the particular switching event that has been detected.

The scheme manager 130 manages the different shaping and prioritizing schemes and profiles according to the present invention. In a preferred implementation, a network operator has, e.g. during a system design phase, generated at least one, but preferably a multitude of temporary prioritizing schemes that are to be used in different portions of the system in the case a switching event has been detected by the event detector 120. These temporary prioritizing schemes are preferably stored in the scheme manager 130 or in a connected memory 150. The scheme manager 130 also preferably, e.g. in the scheme memory 150, has access to information of which temporary prioritizing scheme to employ at detection of a particular switching event.

In a first embodiment of the invention, once the scheme manager 130 receives the detection signal from the event detector 120, it uses information in the signal to determine which temporary prioritizing scheme to use. In the case where the traffic manager only has a single temporary prioritizing scheme, of course, no information of the particular switching event need to be included in the detection signal. The scheme manager 130 then fetches and compiles information of the (selected) temporary prioritizing scheme that is to be communicated to relevant communication terminals. This compiled information contains the complete description of the temporary prioritizing scheme and all instructions that are required by the communication terminals for implementing and start applying the temporary scheme. This information is brought to a configuration manager 140 that uses it for generating the prioritizing scheme update message of the invention.

In another embodiment of the invention, the scheme manager 130 fetches and compiles information of all available prioritizing schemes, or at least a portion thereof. This information is provided to the configuration manager 140 that generates a scheme message based on the information. This scheme message is distributed by means of the I/O unit 110 to communication terminals in the system. This means that the communication terminals will already have access to the complete description and instructions of a temporary prioritizing scheme once it receives a prioritizing scheme update message. As a consequence, once the scheme manager 130 receives the detection signal from the event detector 120 it provides an identifier of the temporary prioritizing scheme associated with the detected switching event (as determined using the detection signal). This identifier is brought to the configuration manager 140 that composes the scheme update message based on this scheme identifier. The message is sent to relevant terminals by the I/O unit 110. Even though no general distribution of temporary prioritizing schemes has been performed, this identifier-containing update message could also be utilized for communication terminals, which already once has used the temporary scheme associated with the identifier and which therefore already has access to the descriptions and instructions necessary for implementing the temporary scheme.

The configuration manager 140 of the traffic manager 100, thus, composes the prioritizing scheme update messages that are sent to the terminals. The configuration manager 140 could also be responsible for selecting to which communication terminals the update message should be selected. As has been discussed in the foregoing, the event detection by the detector 120 is based on the flow distribution in a first portion of the system and the update message is to be transmitted to terminals in a second portion of the system to obtain a temporary change of data transmission pattern in this second portion. In the case, the second portion is equal to the first portion, the update message could simply be transmitted to all communication terminals present in this system portion and that have multiple application flows that would be affected by the temporary prioritizing scheme. In the case only uplink (downlink) data transmission are to be effected, the update message need then only be communicated to user terminals (base stations).

The configuration manager 140 preferably receives further input information from base stations and/or network control nodes in the system of the particular communication terminals present in the different portions of the system and which data flows these terminals currently manages. This collected input information will then be used by the manager 140 when selecting the update message. This update message can then be transmitted directly to the relevant communication terminals using the I/O unit 110 but is typically forwarded to these terminals by different network nodes and base stations. The update message could, thus, be broadcast, multicast or unicast to the terminals.

The prioritizing scheme update message can also comprise information of the previously discussed scheme implementation criterion and/or the scheme restoring criterion. In the case any of these criteria are reception of an implementation/restoring message, the configuration manager 140 or some other dedicated message engine in the traffic manager 100 preferably composes such a message.

It could also be possible that a switching event is associated with multiple temporary prioritizing schemes, implying that in the case the event detector 120 detects this particular event, a first set of relevant communication terminals should temporarily use a first prioritizing scheme, whereas a second set of terminals should use a second temporary prioritizing scheme. The update message could then include information of both these prioritizing schemes and instruction to terminals of the first set to use the first scheme and instructions to second set terminals to use the other prioritizing scheme. Alternatively, a first update message comprising information of the first temporary scheme is transmitted to the terminal(s) of the first set and a second update message with the second scheme information is likewise sent to terminal(s) of the second set.

The units 110 to 140 of the traffic manager 100 may be provided as software, hardware or a combination thereof. The units 110 to 150 may be implemented together in a network node, e.g. a control network node such as RNC or BSC, or a base station node. Particularly for an ad-hoc system but also other communication systems, the traffic manager 100 can be implemented in a communication terminal, whose data transmission pattern actually can be changed through the operation of the traffic manager 100. This means that one and the same terminal will generate and implement prioritizing scheme update messages. Also a distributed implementation is possible with some of the units provided in different network nodes.

Figure 12:
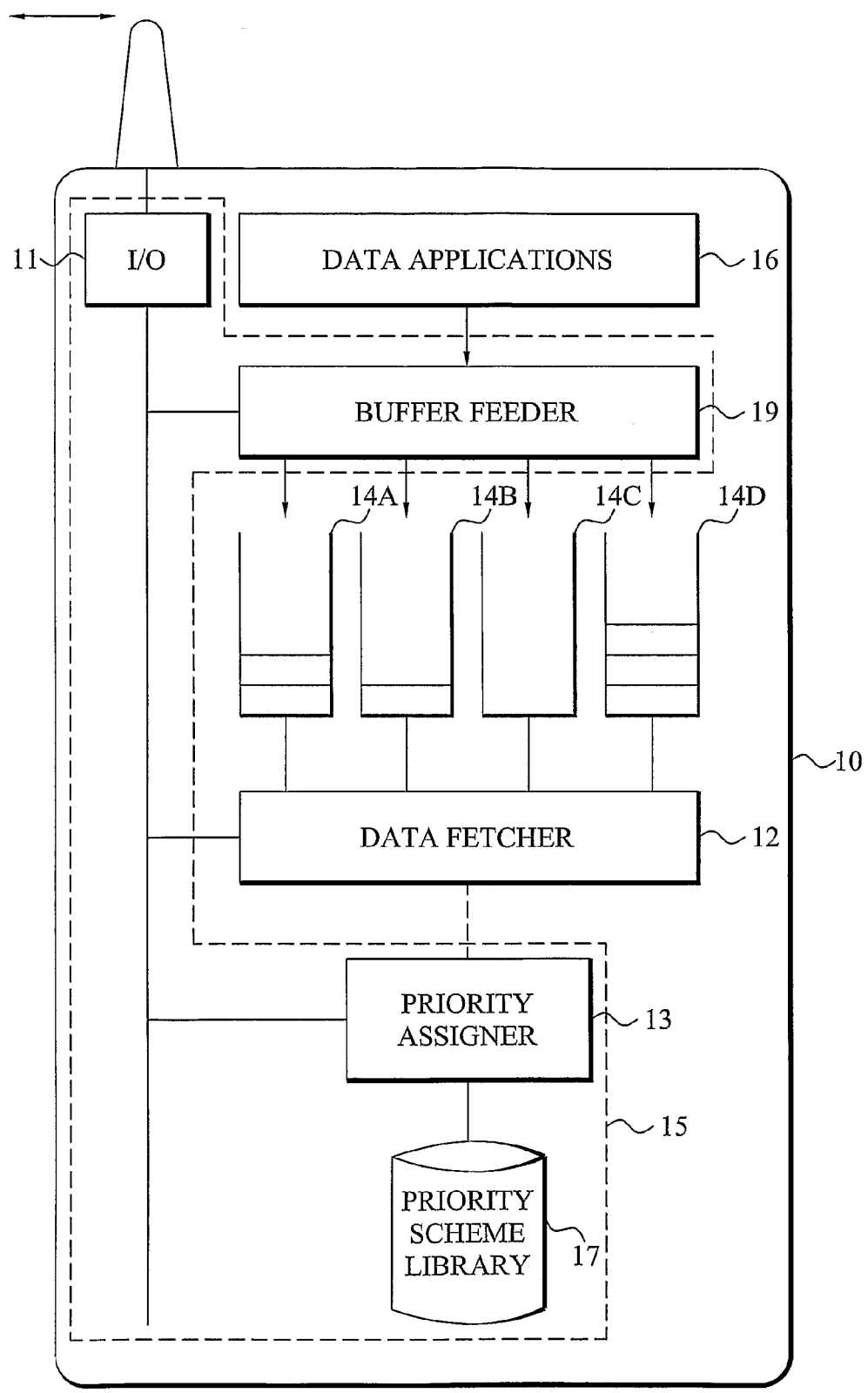
FIG. 12 is a schematic block diagram of a communication terminal comprising a traffic manager according to an embodiment of the present invention.

FIG. 12 is a schematic block diagram of an embodiment of a communication terminal 10 according to the present invention, represented by a mobile user terminal in the figure. Generally, a communication terminal according to the invention that is to temporarily use an auxiliary prioritizing scheme for its application flows can be a so-called end terminal, system, gateway, unit or server in the communication chain or have the functionality of a bridge, router, switch or proxy in that it forwards data from communication terminals to other terminals.

The terminal 10 comprises an I/O unit 11 for conducting communication with external units. This I/O unit 11, thus, comprises functionality (modulator/demodulator, coder, decoder, etc.) for processing, transmitting and receiving data packets. The I/O unit 11 also receives prioritizing scheme update messages and possible scheme implementation/restoring messages originating from an external traffic manager.

The terminal 10 also includes different service or data applications 16 that generate data to be communicated to other terminals in the system. These applications 16 collectively represent the different communication services and control signal functionalities that are present in a general communication terminal 10. Different terminal types and models typically have different such applications 16. Typical examples include a general voice/conversational application, different multimedia applications, video telephony applications, etc.

The communication terminal 10 comprises at least one transmit buffer 14A-14D in which data of different data flows from the applications 16 are entered before transmission. In a typical implementation, the terminal 10 comprises one transmit buffer 14A-14D for each application flow or for each QoS class that possible could include multiple application flows. It is anticipated by the invention that these multiple buffers 14A-14D may actually be one and the same data memory in the terminal 10 but then typically occupy different sections of the memory.

The different transmit buffers 14A-14D or the different application flows (flow classes) have assigned priority values according to a default prioritizing scheme. This default scheme could be implemented in a memory 17 of the terminal 10, may have been received when connected to the system or provided at some other time instance. A data fetcher 12 of the terminal 10 fetches, at transmit occasions, data to transmit from the buffers 14A-14D based on the assigned priority values (default prioritizing scheme).

The communication terminal 10 also comprises a local traffic manager 15 that is used according to the present invention for switching to temporary prioritizing schemes. The local traffic manager 15 generally could be regarded as including some of the functionalities I/O unit 11. The manager 15 also comprises a priority assigner 13 and/or a buffer feeder 19 and possible a scheme memory 17.

Once a switch to a temporary prioritizing scheme is to take place, the I/O unit 11 receives a prioritizing scheme update message comprising information of the temporary scheme. The traffic manager then dynamically switches, during the ongoing operation of the terminal 10 and based on the received prioritizing scheme, to the temporary prioritizing scheme assigning temporary transmission priorities to the data flows in the transmit buffers 14A-14D.

In an embodiment of the invention, the information in the update message constitutes a complete description of the temporary prioritizing scheme and any instructions necessary for its implementation. In another embodiment, the terminal 10 already has access to this information in a scheme memory 17. This information could then have been received in a previous scheme update message and/or in the form of a general scheme message containing information of multiple available temporary prioritizing schemes. In such a case, the update message could typically include an identifier of the relevant temporary scheme.

The information of the temporary scheme from the message or from the memory 17 is brought to a priority assigner 13 and/or a buffer feeder 19. In the former case, the priority assigner 13 assigns temporary new transmission priorities to the data flows or transmit buffers 14A-14D. In this priority re-allocation, the priority values of all flows/buffers 14A-14D could be updated or only some of the flows/buffers 14A-14D. The data fetcher 12 will then, at assigned transmission occasions, fetch data to transmit from the buffers 14A-14D according to the new temporary priority values (temporary prioritizing scheme).

If the scheme information is instead brought to the buffer feeder 19, the feeder 19 uses this information when determining in which transmit buffer 14A-14D data of a given application flow is to be entered. In this case, the transmit buffer 14A-14D are assigned different priority values. By then changing, based on the temporary prioritizing scheme, in which buffer 14A-14D data of a particular flow is to be entered, the buffer feeder 19 will temporarily change the priority values associated with the data flows. It is anticipated by the present invention that data of an application flow can, based on the temporary prioritizing scheme, now be entered in more than one transmit buffer 14A-14D. The data fetcher 12 fetches, at transmission occasions, data from the buffers 14A-14D according to the priority values of the buffers 14A-14D.

The buffer feeder 19 or priority assigner 13 could be configured for implementing the temporary prioritizing scheme as soon as the feeder 19 or assigner 13 receives it from the I/O unit 11. In an alternative embodiment, the buffer feeder 19 or priority assigner 13 put the new temporary scheme on hold until an implementation criterion is fulfilled. This criterion could be the reception by the I/O unit 11 of an implementation scheme from the external traffic manager. In other solutions, the local traffic manager 15 itself determines when to start using the temporary scheme, e.g. after a period of time has lapsed (which could be a pre-defined default time period or a time period notified in the update message).

Correspondingly, the buffer feeder 19 or priority assigner 13 will stop employing the temporary prioritizing scheme and switch back to the default scheme based on a restoring criterion. Similarly to the implementation criterion, this could be the reception of a restoring message, the lapse of a period of time or some other restoring event.

The units 11-13, 15, 16 and 19 of the communication terminals 10 may be provided as software, hardware or a combination thereof. The communication terminal 10 could in turn be a wireless user terminal or a wireless data routing terminal or some other communication terminal mentioned in the foregoing, including a wired terminal.

Figure 13:
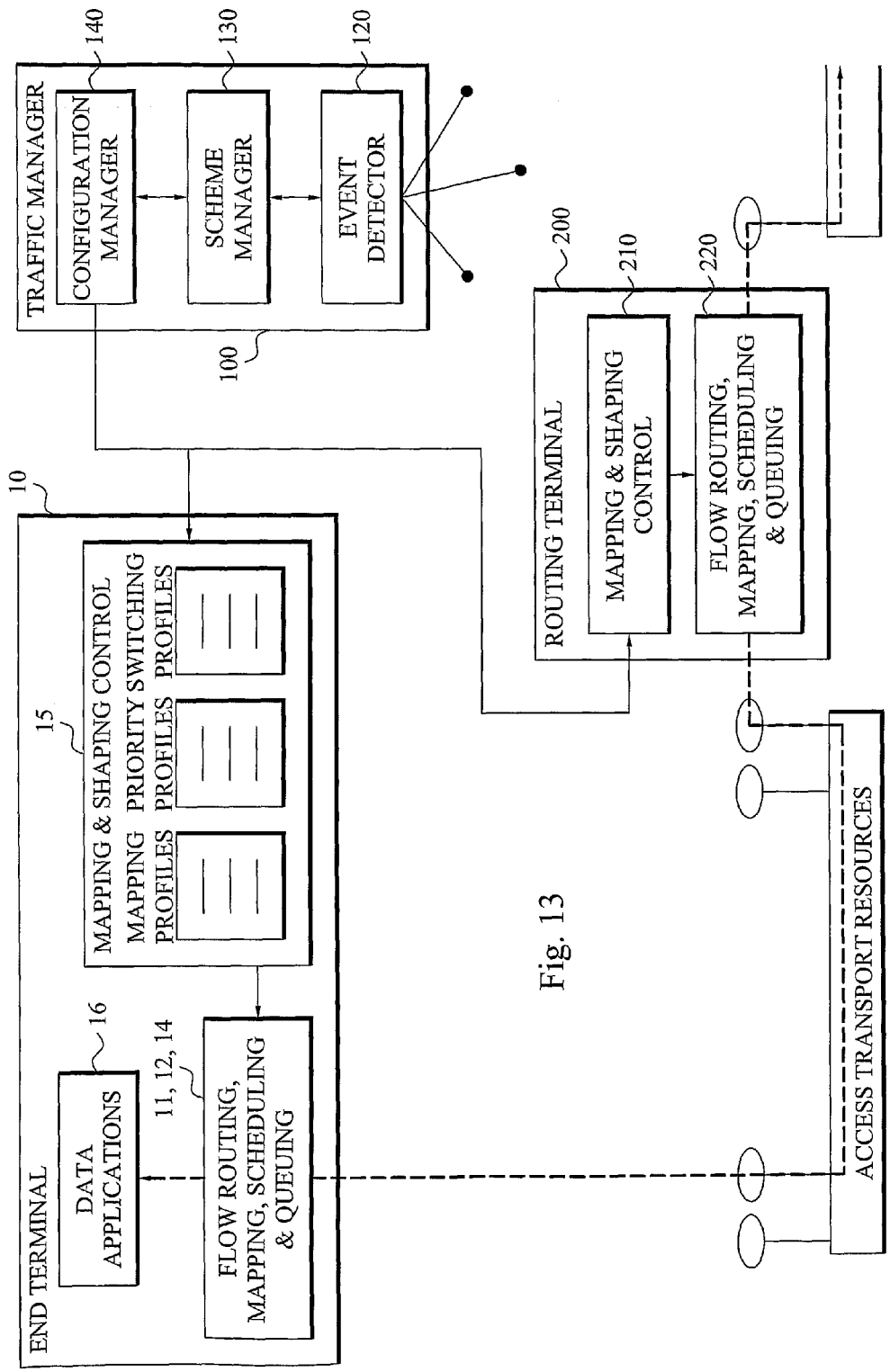
FIG. 13 is a schematic overview of communication terminals involved in the traffic management according to the present invention.

FIG. 13 is a schematic overview of a traffic manager 100 and two communication terminals 10, 200 according to the present invention. This figure furthermore discloses the data trafficking and control trafficking between these units 10, 100, 200.

A first communication terminal, represented by an end terminal 10 in the figure, includes data applications 16 that generate data flows that are transmitted to other terminals in the system. The data is first temporary stored in transmit buffers or queues and is transmitted at time instances determined by a schedule scheme/profile using access transport resources determined using a mapping scheme/profile. The particular data to transmit using the determined resources and at the selected time occasions is in turn determined using a current priority or shaping scheme/profile. In the figure, the functionalities of the I/O unit, data fetcher and transmit buffers of FIG. 12 have been represented as a single unit 11, 12, 14.

A local traffic manager or mapping and shaping control unit 15 of the end terminal 10 manages the different temporary priority profiles according to the present invention. In addition, this unit 15 could also have access to and utilize different mapping profiles that can be exchanged during operation. These mapping profiles specify which access transport resources the data in the buffers are mapped to and should use for the data transmission. In the figure, the unit 15 also has access to different switching profiles that collectively represent the different implementation and restoring events/criteria that are applicable for the prioritizing profiles but possible also for the mapping profiles.

The data from the end terminal 10 is transmitted to a routing terminal 200, e.g. a base station, which also comprises functionality 220 for flow routing, mapping, scheduling and queuing. A corresponding local traffic manager or mapping and shaping control unit 210 is preferably also implemented in the routing terminal 200 for shaping the traffic originating from this terminal 200.

The external traffic manager 100 according to the invention with event detector 120, scheme manager 130 and configuration manager 140 controls the operation of the local mapping and shaping control units 15, 210 of the communication terminal 10, 200. Through this shaping control of the invention by temporary switching to auxiliary prioritizing schemes for data flows, the traffic manager 100 can obtain a very flexibly, fast, local and fine-grained shaping of the data flow distributions and traffic pattern in the communication system.

It will be understood by a person skilled in the art that various modifications and changes may be made to the present invention without departure from the scope thereof, which is defined by the appended claims.

REFERENCES

[1] Sánchez, et al., "Mixing conversational and interactive traffic in the UMTS radio access network", 4$^{th}$ *IEEE Conference on Mobile and Wireless Communication Network* (*WMCN*2002), Stockholm, Sweden, Sep. 9-11, 2002

The invention claimed is:

1. A method in a communication system for managing traffic transmitted by multiple communication terminals, each of said multiple communication terminals having data flows present in at least one transmit data buffer and a respective default prioritizing scheme for assigning transmission priorities to each said data flow, said method comprising the steps of:
   detecting a switching event based on information of an estimated distribution of data flows in a first sub-portion of said communication system;

selecting, based on said switching event detection, a temporary prioritizing scheme among multiple pre-defined temporary prioritizing schemes, each temporary prioritizing scheme being associated with a respective restoring criterion that defines a reversal back to said default prioritizing scheme;

generating, based on said selected temporary prioritizing scheme, a prioritizing scheme update message comprising information of said selected temporary prioritizing scheme, said selected temporary prioritizing scheme assigning temporary transmission priorities to said data flows to obtain a temporary switch of data transmission pattern in a second sub-portion of said communication system; and, transmitting said prioritizing scheme update message to at least one communication terminal in said second sub-portion of said communication system to obtain said temporary switch of data transmission pattern;

wherein each of said first and second sub-portions defines a wireless transmission region of said communication system, and wherein said second sub-portion includes at least a base station, and said first sub-portion includes said second sub-portion and at least one other base station.

2. The method according to claim 1, wherein data flows belong to different quality of service (QoS) classes and said detecting step comprises detecting said switching event based on information of an expected distribution of data flows having different QoS classes in said first sub-portion of said communication system.

3. The method according to claim 1, wherein said prioritizing scheme update message commands a switch back to said default prioritizing scheme upon expiry of a period of time notified in said prioritizing scheme update message.

4. The method according to claim 1, wherein said second sub-portion of said communication system is a sub-portion to said first sub-portion of said communication system.

5. The method according to claim 1, further comprising the steps of:
providing multiple temporary prioritizing schemes;
selecting, for each of said multiple temporary prioritizing scheme, a switching event; and,
storing said multiple temporary prioritizing schemes and information of said switching events.

6. The method according to claim 5, further comprising the step of transmitting at least a portion of said multiple temporary prioritizing schemes to said at least one communication terminal, and said prioritizing scheme update message comprises an identifier of said temporary prioritizing scheme.

7. The method according to claim 1, further comprising the step of transmitting said temporary prioritizing scheme to said at least one communication terminal, and said prioritizing scheme update message comprises an identifier of said temporary prioritizing scheme.

8. The method according to claim 1, further comprising the steps of:
generating implementation information associated with said temporary prioritizing scheme, said implementation information defining when said at least one communication terminal is to implement said temporary prioritizing scheme; and,
transmitting said implementation information to said at least one communication terminal.

9. The method according to claim 1, further comprising the step of transmitting a scheme implementation message to said at least one communication terminal, said scheme implementation message commanding said at least one communication terminal to temporarily use said temporary prioritizing scheme for data flows present in a data transmit buffer of said at least one communication terminal.

10. The method according to claim 1, further comprising the step of transmitting a prioritizing scheme restoring message to said at least one communication terminal, said prioritizing scheme restoring message commanding a switch back to said default prioritizing scheme.

11. The method according to claim 1, wherein said prioritizing scheme update message commanding said at least one communication terminal to dynamically switch, during operation and based on said prioritizing scheme update message, to said temporary prioritizing scheme assigning temporary transmission priorities to said data flows present in said at least one transmit data buffer of said at least one communication terminal.

12. The method according to claim 1, wherein said transmitting step comprises transmitting said prioritizing scheme update message to multiple communication terminals in said second sub-portion of said communication system, said prioritizing scheme update message commanding a first sub-set of said multiple communication terminals to dynamically switch, during operation and based on said prioritizing scheme update message, to a first temporary prioritizing scheme assigning first temporary transmission priorities and commanding a second sub-set of said multiple communication terminals to dynamically switch, during operation and based on said prioritizing scheme update message, to a second different temporary prioritizing scheme assigning second temporary transmission priorities.

13. The method according to claim 1, wherein said communication system is a wireless radio communication system and said at least one communication terminal is selected from a wireless user terminal and wireless data routing terminal.

14. A traffic managing method in a communication terminal having multiple data flows present in at least one transmit data buffer, each of said multiple data flows having an assigned transmission priority according to a default prioritizing scheme, said method comprising the steps of:
receiving, while said terminal is presently located in a first sub-portion of a communication network, a prioritizing switching update message generated based on information of an estimated distribution of data flows in a second sub-portion of said communication network, said prioritizing switching update message comprising information identifying a temporary prioritizing scheme;
dynamically switching, based on said prioritizing switching update message, to said temporary prioritizing scheme and assigning temporary transmission priorities to said multiple data flows, said temporary prioritizing scheme being associated with a restoring criterion defining a reversal back to a default prioritizing scheme; and,
switching back to said default prioritizing scheme when said restoring criterion is met;
wherein each of said first and second sub-portions defines a wireless transmission region of said communication system, and wherein said second sub-portion includes at least a base station, and said first sub-portion includes said second sub-portion and at least one other base station.

15. The method according to claim 14, further comprising the steps of:
selecting data from said at least one transmit data buffer based on said temporary prioritizing scheme; and,
transmitting said selected data at a transmission instance determined based on a scheduling scheme.

16. The method according to claim 14, wherein said communication terminal comprises multiple transmit data buffers having different assigned transmission priorities according to said default prioritizing scheme and each of said multiple data flows being entered in one of said multiple transmit data buffers, and said dynamically switching step comprises temporarily switching, for at least one of said multiple data flows, a transmit data buffer of said multiple transmit data buffers in which said at least one data flow is entered.

17. A traffic manager, comprising:

an event detector detecting a switching event based on information of an estimated distribution of data flows in a first sub-portion of a communication system comprising multiple communication terminals and generating a detection signal based on said switching event detection, wherein each of said multiple communication terminals has data flows present in at least one transmit data buffer and a respective default prioritizing scheme for assigning transmission priorities to said data flows;

a scheme manager selecting, based on said detection signal, a temporary prioritizing scheme among multiple pre-defined temporary prioritizing schemes, each being associated with a respective restoring criterion defining a reversal back to said default prioritizing scheme; and, a message generator generating, based on said selected temporary prioritizing scheme, a prioritizing scheme update message comprising information of said temporary prioritizing scheme assigning temporary transmission priorities to data flows to obtain a temporary switch of data transmission pattern in a second sub-portion of said communication system;

wherein each of said first and second sub-portions defines a wireless transmission region of said communication system, and wherein said second sub-portion includes at least a base station, and said first sub-portion includes said second sub-portion and at least one other base station.

18. The manager according to claim 17, wherein said prioritizing scheme update message commands a switch back to said default prioritizing scheme upon expiry of a period of time notified in said prioritizing scheme update message.

19. The manager according to claim 17, further comprising a transmitter that transmits said prioritizing scheme update message to at least one communication terminal in said second sub-portion of said communication system to obtain said temporary switch of data transmission pattern.

20. The manager according to claim 19, wherein said transmitter transmits at least a portion of said multiple temporary prioritizing schemes to said at least one communication terminal.

21. The manager according to claim 19, wherein said transmitter transmits said temporary prioritizing scheme to said at least one communication terminal, and said prioritizing scheme update message generated by said message generator comprises an identifier of said temporary prioritizing scheme.

22. The manager according to claim 19, wherein said transmitter transmits a scheme implementation message to said at least one communication terminal said scheme implementation message commanding said at least one communication terminal to temporarily use said temporary prioritizing scheme for data flows present in a data transmit buffer of said at least one communication terminal.

23. The manager according to claim 19, wherein said transmitter transmits a prioritizing scheme restoring message to said at least one communication terminal, said prioritizing scheme restoring message commanding a switch back to said default prioritizing scheme.

24. The manager according to claim 17, further comprising an information generator that generates implementation information associated with said temporary prioritizing scheme, said implementation information defining when said at least one communication terminal is to implement said temporary prioritizing scheme, and said transmitter transmits said implementation information to said at least one communication terminal.

25. A control network node comprising said traffic manager according to claim 17.

26. A communication terminal comprising said traffic manager according to claim 17.

27. A traffic manager adapted for use in a communication terminal having multiple data flows present in at least one transmit data buffer, said traffic manager comprising:

a processor;

a memory storing program instructions which, when executed by said processor, perform the operations comprising:

dynamically switching, while said terminal is presently located in a first sub-portion of a communication network, and based on a received prioritizing switching update message based on information of an estimated distribution of data flows in a second sub-portion of said communication network, to a temporary prioritizing scheme assigning temporary transmission priorities to said multiple data flows, wherein each of said multiple data flows has an assigned transmission priority according to a default prioritizing scheme; and switching back to said default prioritizing scheme when a restoring criterion associated with said temporary prioritizing scheme and defining a reversal back to said default prioritizing scheme is met;

wherein each of said first and second sub-portions defines a wireless transmission region of said communication system, and wherein said second sub-portion includes at least a base station, and said first sub-portion includes said second sub-portion and at least one other base station.

28. The traffic manager according to claim 27, further comprising:

a data manager that selects data from said at least one transmit data buffer based on said temporary prioritizing scheme; and, a transmitter that transmits said data selected by said data manager at a transmission instance determined based on a scheduling scheme.

29. The traffic manager according to claim 27, further comprising:

a receiver that receives said temporary priority scheme; and, storing said temporary priority scheme in said memory, wherein said prioritizing scheme update message comprises an identifier of said temporary priority scheme.

30. The traffic manager according to claim 27, wherein said communication terminal comprises multiple transmit data buffers having different assigned transmission priorities according to said default prioritizing scheme and a data manager enters each of said multiple data flows in one of said multiple transmit data buffers determined based on said default prioritizing scheme, and said scheme switch is configured for temporary switching, for at least one of said multiple data flows, a transmit data buffer of said multiple transmit data buffers in which said at least one data flow is entered.

31. A communication terminal comprising said traffic manager according to claim 27.

32. The terminal according to claim 31, wherein said communication terminal is a wireless user terminal.

33. The terminal according to claim 31, wherein said communication terminal is a wireless data routing terminal.

\* \* \* \* \*

UNITED STATES PATENT AND TRADEMARK OFFICE
CERTIFICATE OF CORRECTION

| | |
|---|---|
| PATENT NO. | : 8,509,242 B2 |
| APPLICATION NO. | : 12/279744 |
| DATED | : August 13, 2013 |
| INVENTOR(S) | : Persson et al. |

It is certified that error appears in the above-identified patent and that said Letters Patent is hereby corrected as shown below:

On the Title Page, Item (51), under "Int. Cl.", in Column 1, Line 1, delete "(2011.01)" and insert -- (2006.01) --, therefor.

Signed and Sealed this
Twenty-second Day of April, 2014

Michelle K. Lee
*Deputy Director of the United States Patent and Trademark Office*